(12) United States Patent
Ulrey et al.

(10) Patent No.: US 9,347,368 B2
(45) Date of Patent: May 24, 2016

(54) METHOD AND SYSTEM FOR FUEL VAPOR MANAGEMENT

(71) Applicant: Ford Global Technologies, LLC, Dearborn, MI (US)

(72) Inventors: Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 882 days.

(21) Appl. No.: 13/660,884

(22) Filed: Oct. 25, 2012

(65) Prior Publication Data

US 2014/0116399 A1 May 1, 2014

(51) Int. Cl.
*F01M 13/00* (2006.01)
*F02B 37/16* (2006.01)
*F02M 25/08* (2006.01)
*F01M 13/02* (2006.01)

(52) U.S. Cl.
CPC ............ *F02B 37/164* (2013.01); *F01M 13/022* (2013.01); *F02M 25/08* (2013.01); *F01M 2013/027* (2013.01); *Y02T 10/144* (2013.01)

(58) Field of Classification Search
CPC . F01M 13/021; F01M 13/022; F01M 13/023; F01M 13/025; F01M 2013/027; F02B 37/16; F02B 37/164; F02B 37/127; F02B 2037/162
USPC .......................... 123/520, 562–566, 572, 574
See application file for complete search history.

(56) References Cited

U.S. PATENT DOCUMENTS

| | | | |
|---|---|---|---|
| 4,557,226 A * | 12/1985 | Mayer | F01M 13/00 123/41.86 |
| 6,016,460 A | 1/2000 | Olin et al. | |
| 6,666,192 B2 | 12/2003 | Rodriguez et al. | |
| 6,670,067 B2 | 12/2003 | Sato et al. | |
| 7,320,315 B2 | 1/2008 | Amano et al. | |
| 7,966,996 B1 | 6/2011 | Pursifull | |
| 8,109,259 B2 | 2/2012 | Ulrey et al. | |
| 8,695,339 B2 * | 4/2014 | Spix | F02B 37/18 123/572 |
| 8,991,365 B2 * | 3/2015 | Konohara | F01M 13/022 123/559.1 |
| 2001/0022175 A1 * | 9/2001 | Moren | F01M 13/022 123/572 |
| 2005/0000496 A1 * | 1/2005 | Norrick | F02M 25/06 123/563 |
| 2011/0132311 A1 | 6/2011 | Pursifull et al. | |
| 2012/0247438 A1 * | 10/2012 | Konohara | F01M 13/022 123/559.1 |
| 2014/0224232 A1 * | 8/2014 | Hotta | F01M 13/011 123/574 |

OTHER PUBLICATIONS

Russ, Stephen George, "Vacuum Generation with a Peripheral Venturi," U.S. Appl. No. 13/681,072, filed Nov. 19, 2012, 26 pages.
Anonymous, "An EVAP Purge Method for GTDI Engines," IPCOM No. 000233166, Published Nov. 27, 2013, 2 pages.
Anonymous, "A Combined Aspirator With an Integrated Dual Check Valve Assembly," IPCOM No. 000239163, Published Oct. 17, 2014, 2 pages.

* cited by examiner

*Primary Examiner* — Erick Solis
(74) *Attorney, Agent, or Firm* — Julia Voutyras; Alleman Hall McCoy Russell & Tuttle LLP (57) ABSTRACT

Methods and systems are provided for shared handling of fuel vapor purge and crankcase ventilation in an engine system. Fuel vapors from each of a canister and a crankcase are drawn into an intake manifold in a common direction during both boosted and non-boosted engine operating conditions using vacuum drawn at various aspirators. Compressor bypass flow through a first aspirator is used to enhance vacuum produced during boosted conditions while throttle bypass flow through a second aspirator is used to enhance vacuum produced during non-boosted conditions.

19 Claims, 5 Drawing Sheets

METHOD AND SYSTEM FOR FUEL VAPOR MANAGEMENT

FIELD

The present invention relates to common handling of a fuel vapor purge system, a crankcase ventilation system, and vacuum actuator systems in boosted engines.

BACKGROUND/SUMMARY

Vehicle emission control systems may be configured to store fuel vapors from fuel tank refueling and diurnal engine operations in a charcoal canister. During a subsequent engine operation, the stored vapors can be purged into the engine where they are combusted. Various approaches may be used to generate vacuum for drawing in the fuel vapors. For example, an intake manifold vacuum generated during engine spinning can be used to draw in the stored fuel vapors. As another example, boosted intake air may be directly or indirectly used to purge the fuel vapors. Yet another example approach is shown by Ulrey et al. in U.S. Pat. No. 8,109,259. Therein, compressed air is directed through a crankcase to yield a crankcase effluent. Then, crankcase effluent is combined with the effluent from the canister which includes the stored fuel vapors. The combined effluent is then purged to the engine intake.

The inventors herein have recognized that such approaches may have limited performance during conditions when manifold pressure (or MAP) is at or near atmospheric conditions (or BP). In particular, during such conditions, the amount of vacuum available for purging the fuel vapors may be low, leading to a large vacuum valley. The reduction in the amount of purge vacuum available may lead to incomplete purging and degraded emissions. Further, in some examples, fuel economy may be sacrificed in order to increase vacuum for fuel purging, e.g. by forcing an engine re-start on an HEV by reducing use of variable camshaft timing or variable valve lift. Still other approaches may employ electric pumps for vapor purge in order to avoid this fuel economy penalty. However, such pumps may be expensive, and the electricity to power them may increase parasitic loads which degrade fuel economy.

In one example, some of the above issues may be at least partly addressed by a method for a boosted engine comprising: during boosted conditions, drawing vacuum at a first aspirator using compressor bypass flow. Then, during non-boosted conditions, the method includes enhancing intake manifold vacuum by drawing vacuum at a second aspirator using intake throttle bypass flow. Further, during both conditions, the method includes applying the drawn vacuum to purge fuel vapors from each of a canister and a crankcase to the intake manifold. In this way, one or more aspirators can be used to enhance low intake manifold vacuum and improve purging efficiency.

As an example, during non-boosted conditions, fuel vapors (from a fuel tank) previously stored in a canister may be drawn into an engine intake along with fuel vapors from a crankcase. In particular, both the canister vapors and the crankcase gases may be drawn into the intake manifold in a first, common direction using intake manifold vacuum. Optionally, the intake manifold vacuum may be enhanced (e.g., when manifold pressure is substantially at atmospheric pressure) by flowing at least a portion of intake air through an aspirator coupled in a throttle bypass and drawing additional vacuum at the aspirator. Alternatively, the intake manifold vacuum may be harnessed by flowing crankcase gases through an aspirator and drawing additional vacuum at the aspirator. In this way, throttle bypass flow is used to draw in the fuel vapors during non-boosted conditions.

During boosted conditions, fuel vapors from the canister and the crankcase may be drawn into a compressor inlet using vacuum generated at an aspirator coupled in a compressor bypass. Therein, both the canister vapors and the crankcase bypass gases may be drawn into the intake manifold via the compressor inlet in the first, common direction. In this way, compressor bypass flow is used to draw in the fuel vapors during boosted conditions.

In this way, one or more aspirators coupled to an engine system may be advantageously used to provide additional vacuum for purging canister and crankcase fuel vapors. By using throttle bypass flow or crankcase flow to generate vacuum at an aspirator during non-boosted conditions, intake manifold vacuum can be enhanced during conditions when a large vacuum valley would otherwise occur. By using a compressor bypass flow to generate vacuum at a different aspirator during boosted conditions, the generated vacuum can be used to draw the canister and crankcase fuel vapors into the intake manifold while flowing the vapors in the same direction as during non-boosted conditions. The common handling of fuel vapors from the canister and the crankcase, as well as the unidirectional flow of the vapors during both boosted and non-boosted conditions reduces system complexity and enables component reduction benefits to be achieved without degrading purging efficiency. For example, a single oil separator can be used at the crankcase. By using an existing air flow to generate a purging vacuum at the aspirators, the need for dedicated vacuum pumps is reduced, reducing related parasitic loads. Overall, emissions performance is improved without reducing fuel economy.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

Figure 1:
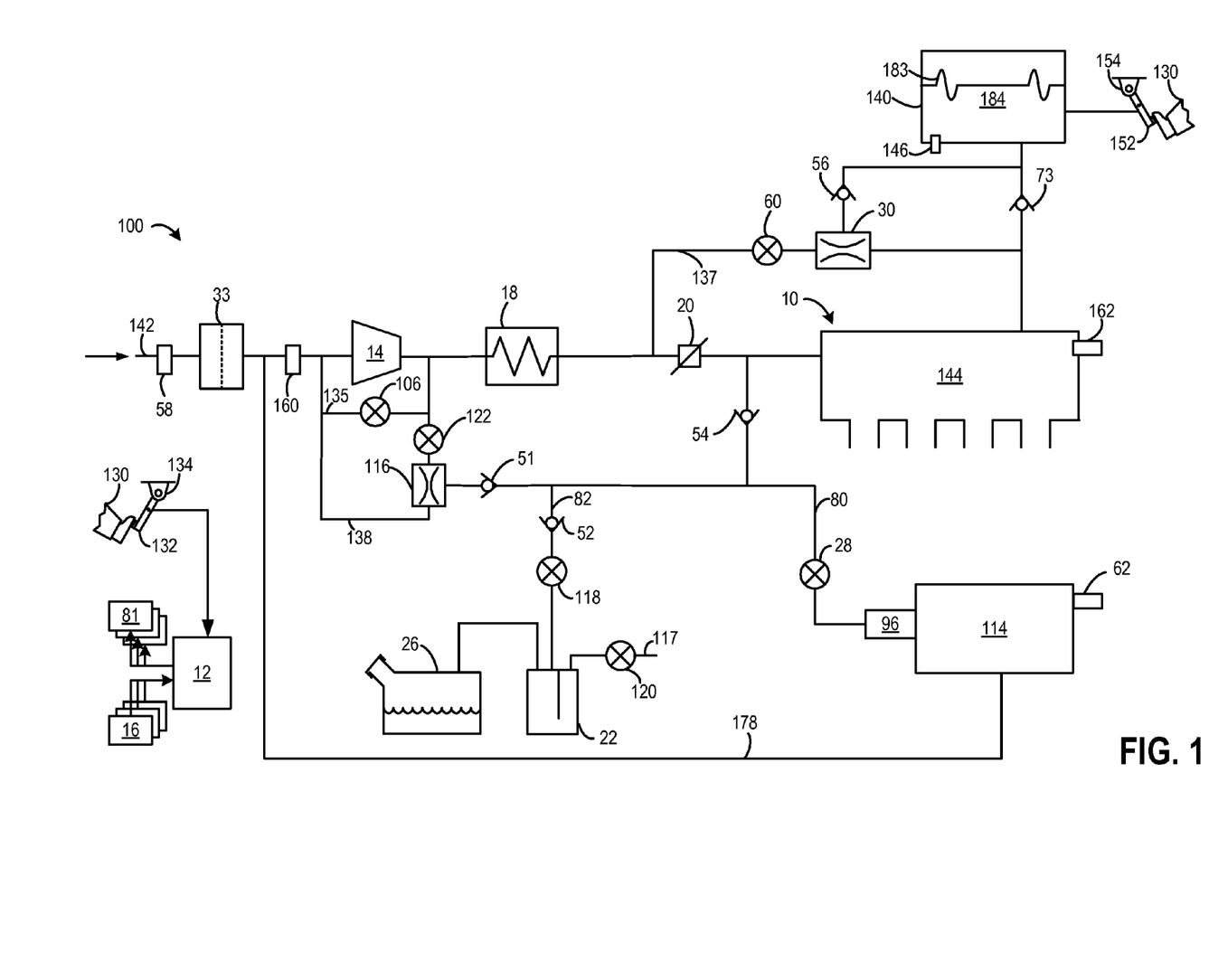
FIGS. 1-3 show example embodiments of an engine system configured for using multiple aspirators to enhance a manifold vacuum available for combined purging of fuel vapors from a fuel system and a crankcase ventilation system.
Figure 2:
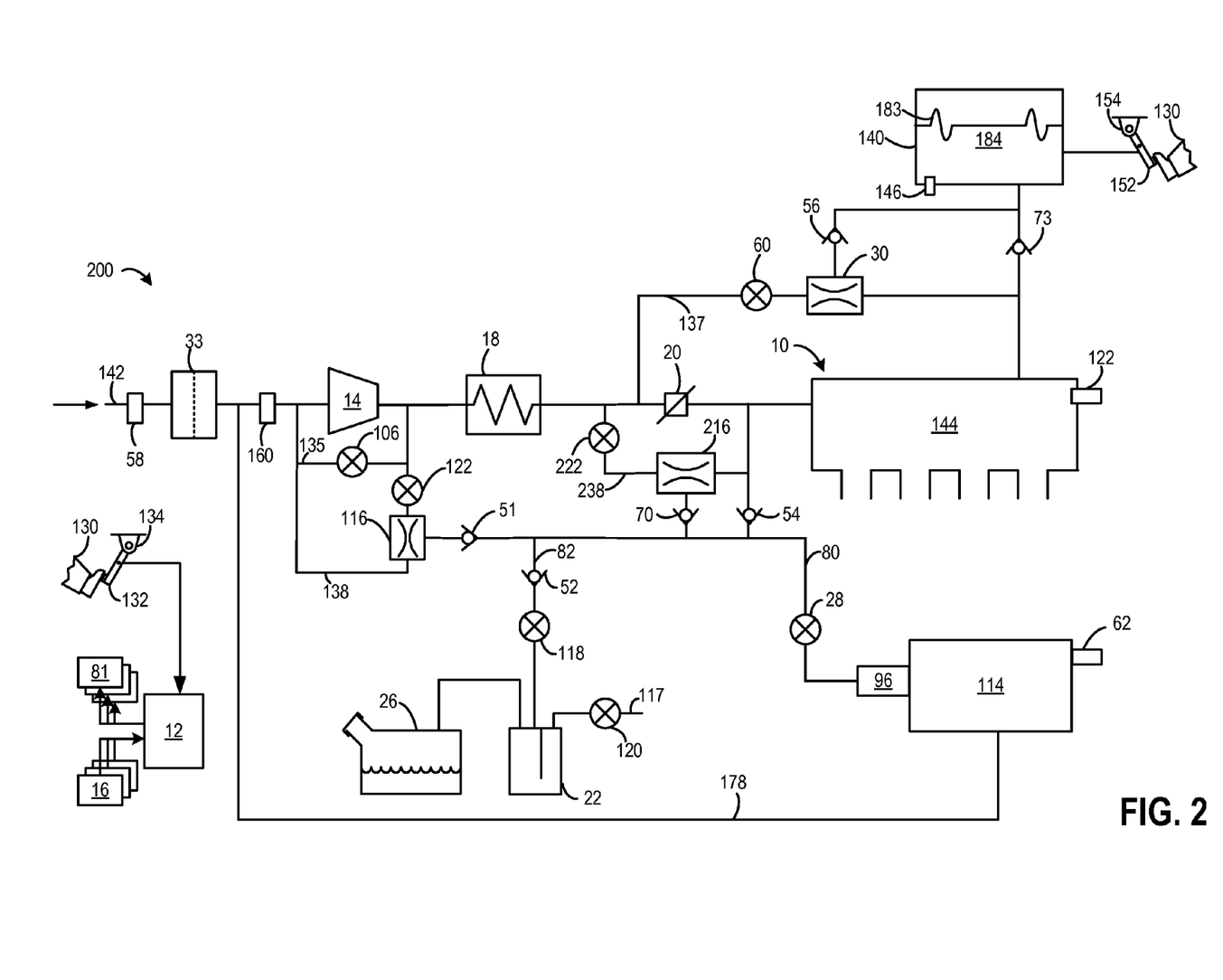
Figure 3:
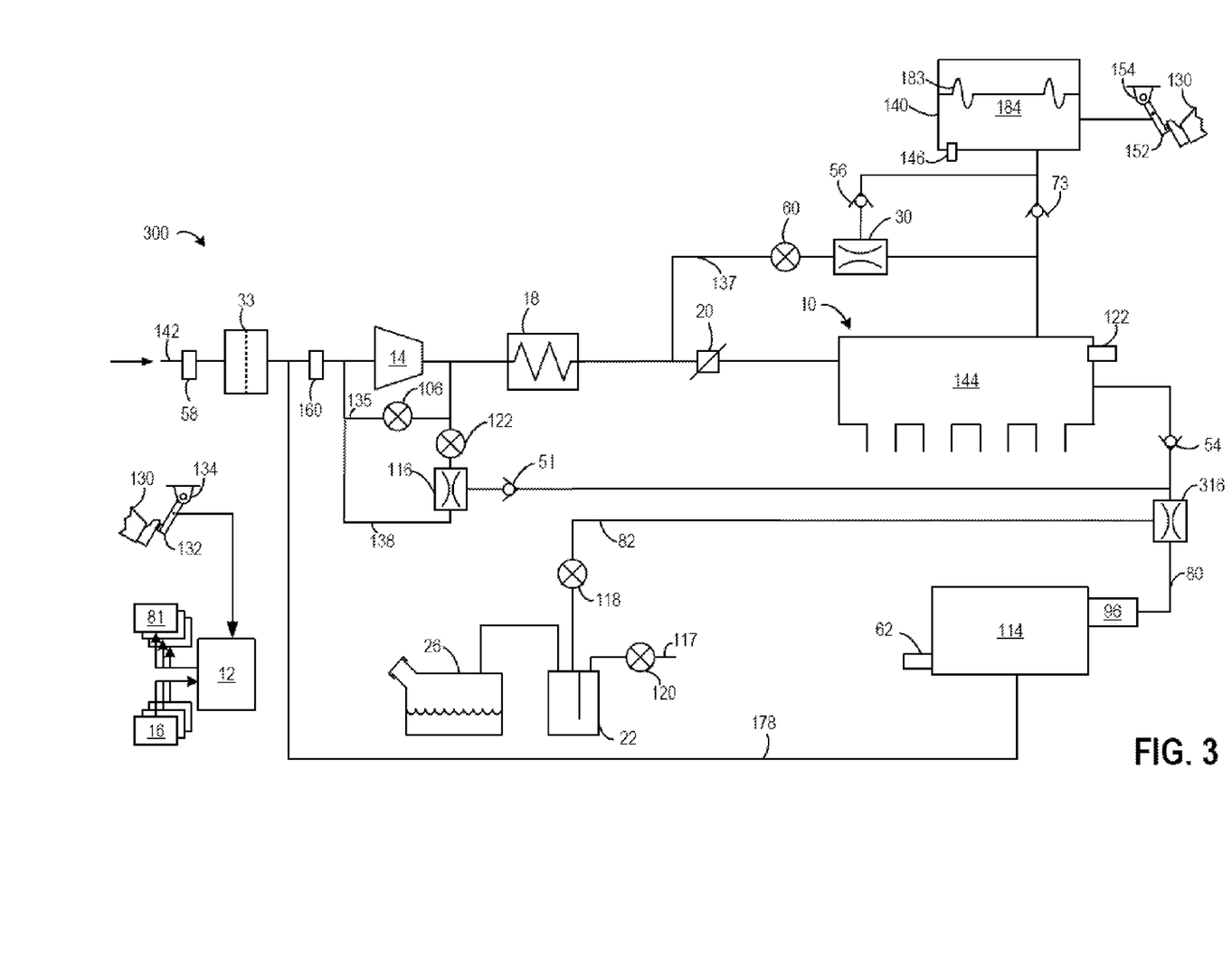

Methods and systems are provided for enhancing manifold vacuum during boosted and non-boosted engine operating conditions using vacuum generated at multiple aspirators coupled to an engine system (such as the aspirators and engine system of FIGS. 1-3). A controller may be configured to perform a control routine, such as the example routine of FIG. 5, to divert a portion of compressed air through a first aspirator during boosted conditions while diverting a portion of intake air through a second aspirator during non-boosted conditions to enhance vacuum generated for purging operations. Further, a crankcase flow can be harnessed through an aspirator to enhance an intake manifold vacuum. The enhanced vacuum may then be used to jointly draw fuel vapors from both a fuel system canister and a crankcase ventilation system. In this way, an intake manifold vacuum can be enhanced (FIG. 4) to improve purging efficiency. By coordinating and combining fuel vapor purging with crankcase ventilation, synergistic benefits are achieved.

The subject matter of the present disclosure is now described by way of example and with reference to certain illustrated embodiments. Components that may be substantially the same in two or more embodiments are identified coordinately and are described with minimal repetition. It will be noted, however, that components identified coordinately in different embodiments of the present disclosure may be at least partly different. It will be further noted that the drawings included in this disclosure are schematic. Views of the illustrated embodiments are generally not drawn to scale; aspect ratios, feature size, and numbers of features may be purposely distorted to make selected features or relationships easier to see.

Referring now to FIG. 1, it shows aspects of an example engine system 100 for a motor vehicle. The engine system is configured for combusting fuel vapor accumulated in at least one component thereof. Engine system 100 includes a multi-cylinder internal combustion engine, generally depicted at 10, which may be included in a propulsion system of an automotive vehicle. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP.

Engine 10 includes an air intake throttle 20 fluidly coupled to an engine intake manifold 144 along an intake passage 142. Air may enter intake passage 142 from an air intake system (AIS) including an air cleaner 33 in communication with the vehicle's environment. A position of throttle 20 may be varied by controller 12 via a signal provided to an electric motor or actuator included with the throttle 22, a configuration that is commonly referred to as electronic throttle control (ETC). In this manner, the throttle 22 may be operated to vary the intake air provided to intake manifold 144 and the plurality of cylinders therein. A mass air flow sensor 58 may be coupled in intake passage 142 for providing a signal regarding mass air flow (MAF). A manifold air pressure sensor 162 may be coupled to intake manifold 144 for providing a signal regarding manifold air pressure (MAP) to controller 12.

Engine system 100 may further include a turbocharger compressor 14 for providing a boosted intake aircharge to intake manifold 144. Compressor 14 may be mechanically coupled to and driven by a turbine powered by hot exhaust gas flowing from the engine. In the configuration illustrated in FIG. 1, the turbocharger compressor also draws fresh air from air cleaner 33 and flows compressed air through intercooler 18. The intercooler cools the compressed air, which then flows via throttle valve 20 to intake manifold 144.

A compressor bypass 135 may be coupled across compressor 14 to divert a portion of intake air compressed by compressor 14 back upstream of the compressor. An amount of air diverted through bypass 135 may be controlled by opening compressor bypass valve (CBV) 106. By controlling CBV 106, and varying an amount of air diverted through the bypass passage 135, a boost pressure provided downstream of the compressor can be regulated. This enables boost control and surge control. A compressor inlet pressure sensor 160 is coupled immediately upstream of the compressor for providing a signal regarding compressor inlet pressure (CIP) to controller 12.

A first aspirator 116 may be coupled to compressor bypass 135. In particular, first aspirator 116 may be positioned in a first conduit 138 coupled across compressor bypass 135. Thus, by varying an opening of CBV 106, an amount of compressed air diverted through compressor bypass 135 and first aspirator 116 may be varied. In some embodiments, first conduit 138 may further include a first aspirator control valve 122 positioned upstream of an inlet of first aspirator 116 for varying a flow rate of air flowing through first aspirator 116. For example, during a boost pressure build-up period, first aspirator control valve 122 may be closed to expedite boost pressure build-up (and thereby reduce turbo lag). In comparison, by opening first aspirator control valve 122 when boost increase is not required, vacuum generation can be restored once sufficient boost pressure has been established. In one example, first aspirator control valve 122 is closed only when a vehicle operator initially applies an accelerator pedal. In this way, during boosted conditions, vacuum is drawn at the first aspirator using compress bypass flow. As such, if first aspirator control valve 122 was actuated open at all times, there may be a reduction in the rate of build of intake manifold pressure during a transient when maximum engine output is being requested.

Engine system 100 may include one or more vacuum consumption devices that are vacuum-actuated. As an example, engine system 100 may include a brake booster 140 coupled to vehicle wheel brakes (not shown). Brake booster 140, including a brake booster vacuum reservoir 184, may be coupled to intake manifold 144 via check valve 73. Check valve 73 allows air to flow to intake manifold 144 from brake booster 140 and limits air flow to brake booster 140 from intake manifold 144. Brake booster 140 may include a vacuum reservoir 184 (or vacuum cavity) behind a diaphragm 183 of the brake booster for amplifying a force provided by a vehicle operator 130 via a brake pedal 152 for applying vehicle wheel brakes (not shown).

Vacuum reservoir 184 may also receive vacuum from aspirator 30 or intake manifold 144. In particular, a portion of intake air may flow from upstream of intake throttle 20 into intake manifold 144 via conduit 137. While flowing through conduit 137, the air may passage through aspirator 30, generating vacuum at the aspirator's vacuum inlet. A portion of intake air diverted through aspirator 30, and consequently a vacuum generated at aspirator 30, may be controlled by conduit valve 60. Further, a check valve 56 coupled between the aspirator's vacuum inlet and brake booster 140 may prevent backflow of vacuum from the brake booster reservoir 184 towards aspirator 30. A vacuum level at brake booster 140 may be estimated by pressure sensor 146.

Intake manifold 144 is configured to supply intake air or an air-fuel mixture to a plurality of combustion chambers of engine 10. The combustion chambers may be arranged above a lubricant-filled crankcase 114, in which reciprocating pistons of the combustion chambers rotate a crankshaft. The reciprocating pistons may be substantially isolated from the crankcase via one or more piston rings, which suppress the flow of the air-fuel mixture and of combustion gasses into the crankcase. Nevertheless, a significant amount of fuel vapor, un-burned air, and exhaust gases may 'blow by' the piston rings and enter the crankcase over time. To reduce the degrading effects of the fuel vapor on the viscosity of the engine lubricant and to reduce the discharge of the vapor into the atmosphere, the crankcase may be continuously or periodically ventilated, as further described hereinafter. In the configuration shown in FIG. 1, crankcase ventilation valve 28 controls the purging of fuel vapors from the crankcase into the intake manifold along crankcase ventilation line 80.

In one embodiment, crankcase ventilation valve 28 may be a one-way passive valve that provides continual evacuation of crankcase gases from inside the crankcase 114 before connecting to the intake manifold 144. The one-way valve may seal when flow through crankcase ventilation line 80 would tend to flow in the opposite direction. In another embodiment, crankcase ventilation valve 28 may be a valve that varies its flow restriction in response to the pressure drop across it (or flow rate through it). In still other examples, the crankcase ventilation valve may be an electronically controlled valve. Therein, controller 12 may command a signal to change a position of the valve from an open position (or a position of high flow) to a closed position (or a position of low flow), or vice versa, or any position there-between.

It will be appreciated that, as used herein, crankcase ventilation flow refers to the flow of fuel vapor and gases from the crankcase to the intake manifold along ventilation line 80. Similarly, as used herein, crankcase backflow refers to the flow of fuel vapors and gases along ventilation line 80 from the intake manifold to the crankcase. Backflow may occur when intake manifold pressure is higher than crankcase pressure (e.g., during boosted engine operation). In some embodiments, a check valve 54 may be coupled between intake manifold 144 and crankcase 114, along ventilation line 80, for preventing crankcase backflow. A pressure of fuel vapors in crankcase 114 may be determined by crankcase pressure sensor 62.

Crankcase 114 may include one or more oil separators 96 for separating oil from the crankcase vapors (or "blowby gas") before the vapors are purged to intake manifold 144. Only one oil separator 96 is included because the configuration shown in FIG. 1 enables unidirectional crankcase ventilation, as described below.

When BP>MAP (e.g., during non-boosted conditions), fresh air is drawn into crankcase 114 from air cleaner 33 along vent tube 178. Crankcase fuel vapors and gases are then vented out in a first direction along ventilation line 80 into an inlet of compressor 14 before being delivered to the intake manifold using intake manifold vacuum. Then, when MAP>BP (e.g., during boosted conditions), the crankcase fuel vapors are drawn in the same, first direction along ventilation line 80 using vacuum generated at first aspirator 116. Check valve 51 coupled in the vacuum line between the compressor inlet and the crankcase prevents backflow from the compressor to the crankcase. In this way, crankcase gases can be drawn into the intake manifold in the same direction through oil separator 96 during each of boosted and non-boosted conditions, providing for unidirectional crankcase ventilation. As such, this unidirectional flow enables component reduction since only a single oil separator 96 is required at the outlet of the crankcase to remove oil from the blow-by gas. In alternate systems, where bi-directional flow is enabled, the crankcase ventilation tube may conduct flow in both directions. Therein, by nearly always providing a vacuum in ventilation line 80, flow in vent tube 178 may mostly always be from crankcase 114 to air cleaner 33.

Engine system 100 further includes fuel tank 26, which stores a volatile liquid fuel combusted in engine 10. To avoid emission of fuel vapors from the fuel tank and into the atmosphere, the fuel tank is vented to the atmosphere through adsorbent canister 22. The adsorbent canister may have a significant capacity for storing hydrocarbon-, alcohol-, and/or ester-based fuels in an adsorbed state; it may be filled with activated carbon granules and/or another high surface-area material, for example. Nevertheless, prolonged adsorption of fuel vapor will eventually reduce the capacity of the adsorbent canister for further storage. Therefore, the adsorbent canister may be periodically purged of adsorbed fuel, as further described hereinafter. In the configuration shown in FIG. 1, canister-purge valve 118 controls the purging of fuel vapors from the canister into the intake manifold along purge line 82. Check valve 52 coupled in purge line 82 prevents backflow from intake manifold 144 into canister 22.

When purging conditions are met, such as when the canister is saturated, vapors stored in fuel vapor canister 22 may be purged to intake manifold 144 by opening canister purge valve 118. While a single canister 22 is shown, it will be appreciated that any number of canisters may be coupled in engine system 100. In one example, canister purge valve 118 may be a solenoid valve wherein opening or closing of the valve is performed via actuation of a canister purge solenoid. Canister 22 further includes a vent 117 for routing gases out of the canister 22 to the atmosphere when storing, or trapping, fuel vapors from fuel tank 26. Vent 117 may also allow fresh air to be drawn into fuel vapor canister 22 when purging stored fuel vapors to intake manifold 144 via purge line 82 and purge valve 118. While this example shows vent 117 communicating with fresh, unheated air, various modifications may also be used. Vent 117 may include a canister vent valve 120 to adjust a flow of air and vapors between canister 22 and the atmosphere.

When BP>MAP (e.g., during non-boosted conditions), fuel vapors are drawn from canister 22 in a first direction along purge line 82 into the intake manifold 144, using intake manifold vacuum. Then, when MAP>BP (e.g., during boosted conditions), the crankcase fuel vapors are drawn in the same, first direction along purge line 82 into the compressor inlet using vacuum generated at first aspirator 116. The fuel vapors are then purged to the intake manifold. Thus, both crankcase gases and fuel vapors can be commonly handled and drawn into the intake manifold together, and in the same direction, during each of boosted and un-boosted conditions. In this way, the embodiment of FIG. 1 uses compressor bypass flow to generate vacuum at a first aspirator during boosted conditions and uses the generated vacuum to purge each of canister fuel vapors and crankcase gases to an engine intake during the boosted conditions. Further, the embodiment uses intake manifold vacuum to purge each of the canister fuel vapors and crankcase gases to the engine intake during non-boosted conditions. Controller 12 may be configured as a microcomputer including a microprocessor unit, input/output ports, an electronic storage medium for executable programs and calibration values, random access memory, keep alive memory, and a data bus. Controller 12 may receive various signals from sensors 16 coupled to engine 10 such as MAF sensor 58; MAP sensor 162, crankcase ventilation pressure sensor 62, CIP sensor 160, brake booster pressure sensor 146, etc. Furthermore, controller 12 may monitor and adjust the position of various actuators 81 based on input received from the various sensors. These actuators may include, for example, throttle 20, intake and exhaust valve systems, canister purge valve 118, canister vent valve 117, crankcase ventilation valve 28, CBV 106, aspirator valves 122 and 60, and compressor 14. Storage medium read-only memory in controller 12 can be programmed with computer readable data representing instructions executable by a processor for performing the methods described below, as well as other variants that are anticipated but not specifically listed. Example methods and routines are described herein with reference to FIG. 5.

Now turning to FIG. 2, an alternate embodiment 200 of engine system 10 is shown where the intake manifold vacuum is enhanced during non-boosted conditions by an aspirator coupled to an intake throttle. In particular, a second aspirator 216 is positioned in conduit 238 coupled across intake throttle 20, herein also referred to as throttle bypass 238. A throttle bypass valve 222 may be opened to divert a portion of intake air received from air cleaner 33 from upstream of throttle 20, through conduit 238, to intake manifold 144, downstream of throttle 20. Air flowing through throttle bypass 238 may flow from an inlet of second aspirator 216 to an aspirator outlet. Flow through the aspirator may be harnessed into vacuum that is drawn from a vacuum inlet of second aspirator 216. By adjusting an amount of air diverted through throttle bypass 238, an amount of vacuum generated at second aspirator 216 may be varied.

The vacuum generated at second aspirator 216 may be used in conjunction with the intake manifold vacuum during non-boosted conditions to draw fuel vapors from each of the crankcase and the canister into the engine intake manifold 144 for purging. Check valve 70 coupled to the vacuum inlet of second aspirator 216 prevents backflow into the aspirator. By using an aspirator enhanced intake manifold vacuum, a vacuum valley that would otherwise be created when MAP approaches or is at BP can be reduced. As further elaborated with reference to FIG. 4, by reducing the manifold vacuum valley, a purging efficiency is improved and a vacuum pump requirement (for meeting the vacuum need in the vacuum valley) is significantly reduced.

A further embodiment 300 of engine system 10 is shown with reference to FIG. 3 wherein the engine system includes a third aspirator for enhancing the intake manifold vacuum. In particular, a third aspirator 316 is coupled in crankcase ventilation line 80 between an outlet of the crankcase 114 and intake manifold 144. During non-boosted conditions, intake air is drawn from downstream of air cleaner 33 into crankcase 114 along vent tube 178 and from there the crankcase gases are vented to a compressor inlet along ventilation line 80. The crankcase flow is harnessed by positioning third aspirator 316 in ventilation line 80 so that all crankcase flow is directed through third aspirator 316. In one embodiment, third aspirator 316 may be sonic choke wherein the need for a dedicated ventilation valve (such as valve 28 of FIGS. 1-2) is reduced. In the depicted embodiment where the third aspirator has the properties of a sonic choke, with a pressure drop of approximately 10 kPa, the sonic choke may result in a constant flow rate at all pressure drops in excess of 10 kPa, for example.

During non-boosted conditions, the vacuum generated at third aspirator 316 is then used, in addition to the vacuum generated at first aspirator 116, to draw each of the crankcase and canister fuel vapors into the engine intake manifold. By enhancing the vacuum generated by the intake manifold vacuum with vacuum generated by harnessing crankcase flow, a vacuum required for purging fuel vapors can be met, in particular during conditions when a manifold vacuum valley may otherwise occur, without needing a dedicated vacuum pump. During boosted conditions, a compressor bypass flow may be harnessed at first aspirator 116 and used to draw each of purge fuel vapors from the canister and crankcase gases from the crankcase along purge line 82 and ventilation line 80 into an inlet of compressor 14. It will be appreciated that fuel vapors from both the canister and the crankcase are drawn into the intake manifold in a common direction during non-boosted operation. Likewise, fuel vapors from both the canister and the crankcase are drawn into the compressor inlet in a common direction during boosted operation. As such the configuration enables crankcase gases to flow out of the crankcase in a common direction during both boosted and non-boosted conditions, thereby allowing use of a single oil separator 96 at the outlet of the crankcase. In comparison, multiple oil separators would have been required at each end of the crankcase if bi-directional flow were configured. Thus, the configuration not only allows for common handling of canister fuel vapors and crankcase gases, but also provides component reduction benefits.

While FIG. 2 shows enhancing a purge vacuum provided by the intake manifold with vacuum generated using throttle bypass flow and FIG. 3 shows enhancing a purge vacuum provided by the intake manifold with vacuum generated using crankcase flow, in still further embodiments, engine system may be configured to include each of second aspirator 216 (of FIG. 2) and third aspirator 316 (of FIG. 3) so that the purge vacuum can be enhanced with each of throttle bypass flow and crankcase flow.

In this way, the system of FIGS. 1-3 enable vacuum to be drawn at a first aspirator using compressor bypass flow during boosted conditions while enabling intake manifold vacuum to be enhanced by drawing vacuum at a second aspirator using intake throttle bypass flow and/or at a third aspirator using crankcase flow, during non-boosted conditions. Then, during both the boosted and non-boosted conditions, the drawn vacuum can be applied to purge fuel vapors from each of a canister and a crankcase to the intake manifold. By merging the fuel vapors from the canister into a common purge line, purging of the canister can be better coordinated with venting of the crankcase. By drawing vapors from the canister and vapors from the crankcase in a common direction through an oil separator (that is, unidirectional flow), during both boosted and non-boosted conditions, component reduction benefits can be achieved, such as by lowering the requirement for multiple oil separators.

Figure 4:
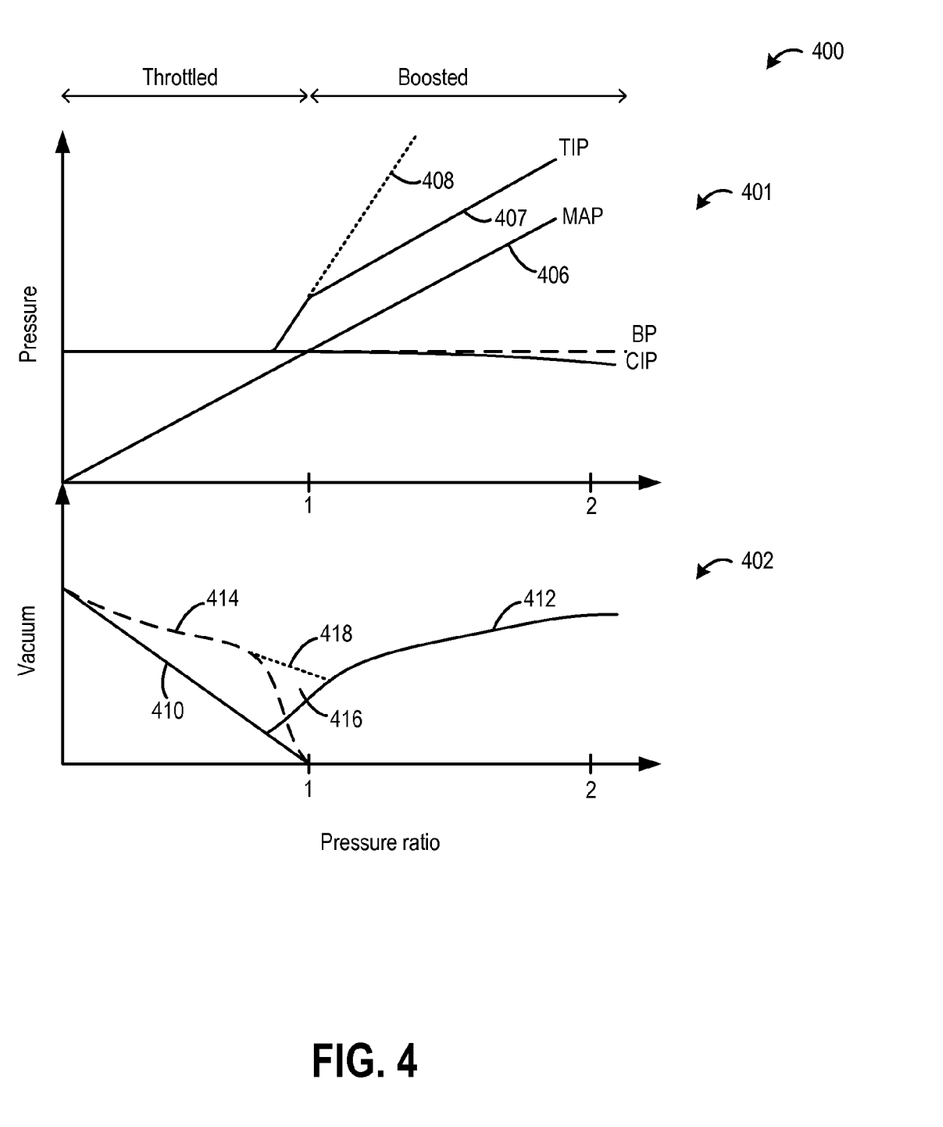
FIG. 4 shows a map illustrating an example change in manifold vacuum valley upon use of the multiple aspirators of FIGS. 1-3.

An example of how the embodiment of FIGS. 2-3 enables an intake manifold vacuum to be enhanced is show with reference to FIG. 4. Specifically, map 400 includes an upper plot 401 depicting pressure along the y-axis and a pressure ratio along the x-axis. The lower plot 402 depicts vacuum along the y-axis and a pressure ratio along the x-axis. Upper plot 401 depicts throttle inlet pressure (TIP) if a boosting device wastegate were closed at plot 408, and throttle inlet pressure if the boosting device wastegate were controlled to keep TIP at a constant level above MAP at plot 407.

When manifold pressure MAP (plot 406) is below barometric pressure BP (dashed line), the engine may be operating throttle (or non-boosted). During such conditions, a purge vacuum for canister purging and crankcase ventilation may be provided by the intake manifold vacuum (plot 410) or by an aspirator that sources air at BP and exhaust air at MAP, such as aspirator 216 of FIG. 2 (plot 414). When using MAP alone for providing vacuum (plot 410), the available purge vacuum goes to zero when MAP is at barometric pressure. When manifold pressure MAP (plot 406) is above barometric pressure BP (dashed line), the engine may be operating boosted. During such conditions, a purge vacuum for canister purging and crankcase ventilation may be provided by first aspirator 116 (FIG. 1) coupled to the compressor bypass (plot 412). In particular, first aspirator 116 that runs on boost air sources air at throttle inlet pressure (TIP, 407) and exhausts at compressor inlet pressure (CIP). Consequently, it may kick in as soon as TIP gets above CIP. Further, the motive flow results from the difference between plot 407 and CIP on graph 401, and produces vacuum curve 412. In other words, plot 414 shows the vacuum enhancement resulting from use of an aspirator that runs from BP to MAP, while plot 412 shows vacuum enhancement resulting from use of an aspirator that runs from TIP to CIP.

A second aspirator coupled to the throttle bypass may also be used during non-boosted conditions to provide a purge vacuum. As such, by itself, the second aspirator may provide vacuum that follow a profile shown at plot 414. As MAP approaches BP, the intake manifold vacuum drops, until there is insufficient vacuum for purging when MAP=BP (when pressure ratio is 1). In addition, during such conditions, neither the first aspirator nor the second aspirator has sufficient vacuum for enabling purge. As a result, a vacuum valley 416 is created when MAP is at BP. This drop in purge vacuum availability when MAP is at BP leads to a corresponding drop in purging efficiency, degrading emissions.

The second aspirator (such as aspirator 216 of FIG. 2) placed between TIP and MAP is powered from the pressure difference (shown on graph 401) of TIP 407 and MAP 406.

By using this pressure difference which is maintained as constant (in steady state), a vacuum may be provided that bridges the valley (418). In particular, vacuum valley 418 may result from TIP minus MAP. Since the second aspirator relying on the TIP minus MAP pressure difference has a greater pressure difference than the first aspirator relying on the TIP minus CIP pressure difference, it may be able to better bridge vacuum valley 418. That is, plot 418 shows the vacuum enhancement resulting from use of an aspirator that runs from TIP to MAP.

By using the second aspirator in conjunction with the intake manifold vacuum, the intake vacuum can be enhanced, as shown by dotted line 418, allowing sufficient purge vacuum to be available even during those conditions. In particular, by super-positioning the suction flow rates of vacuum curve 414 and vacuum curve 412, the vacuum valley can be significantly reduced.

Figure 5:
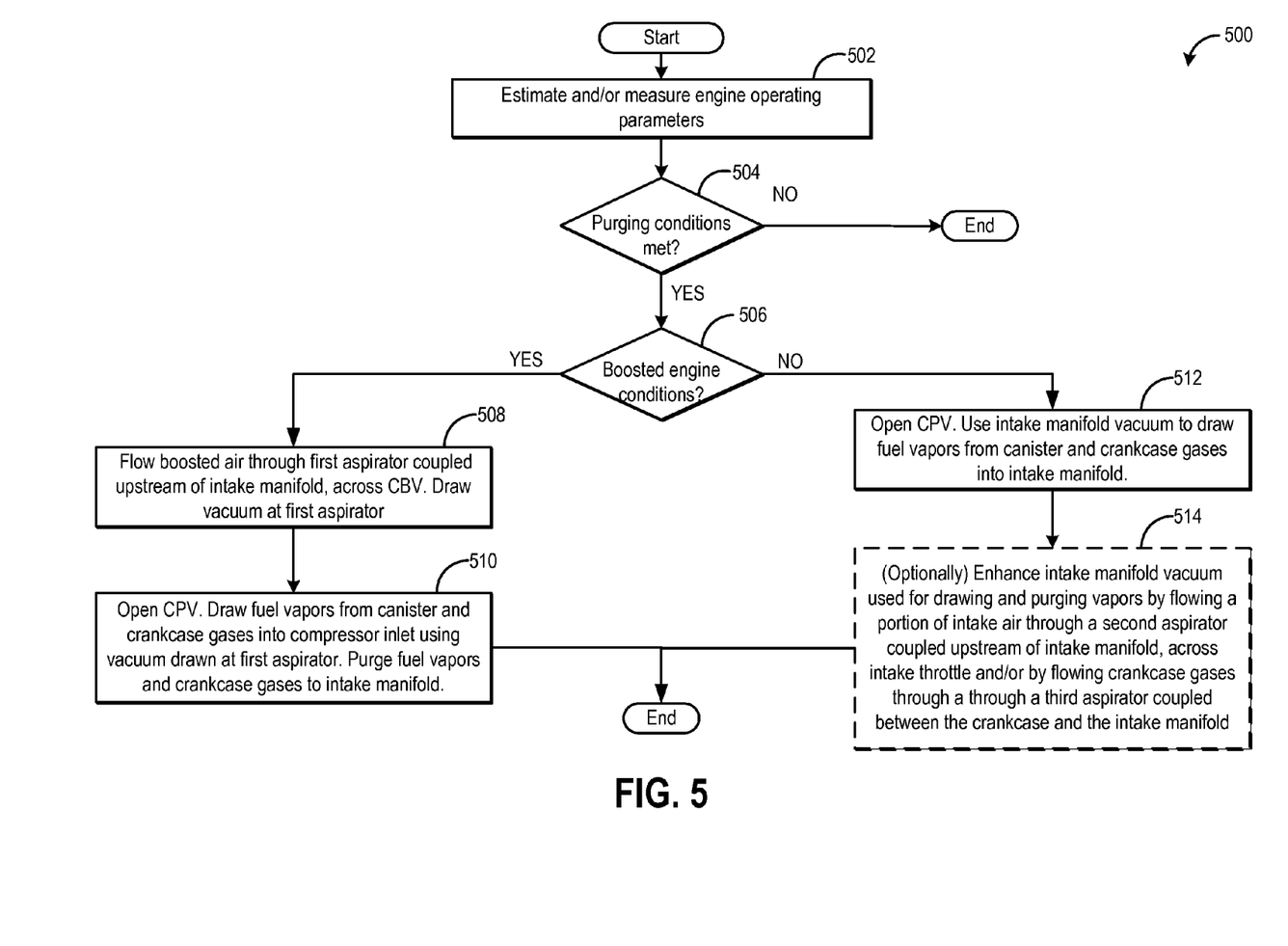
FIG. 5 illustrates a method for generating vacuum at the multiple aspirators of FIGS. 1-5 during boosted and non-boosted engine operating conditions to enable common handling of fuel vapor purge and crankcase ventilation.

Now turning to FIG. 5, an example method 500 is shown for operating an engine system with a plurality of aspirators to enhance a vacuum used for purging fuel vapors from a canister and a crankcase together to an intake manifold. By using vacuum from the aspirators, a purge vacuum requirement can be met without incurring fuel economy penalties.

At 502, the method includes estimating and/or measuring engine operating parameters. These may include, for example, an engine speed, engine temperature, catalyst temperature, MAP, MAF, BP, canister load, vacuum level in a vacuum reservoir coupled to a vacuum consumption device, etc. At 504, it may be determined if canister purging conditions have been met. In one example, canister purging conditions may be considered met if a canister hydrocarbon load (as determined or inferred) is higher than a threshold load. In another example, purging conditions may be considered met if a threshold duration or distance of travel has elapsed since a last canister purging operation.

If purging conditions are confirmed, the routine moves to 506 to determine if boosted engine conditions are present. For example, MAP may be compared to BP to determine if boosted conditions are present. If boosted conditions are present, the routine proceeds to perform a purging operation under boosted conditions at 508-510, as elaborated below. Else, if boosted conditions are not present, then the routine proceeds to perform a purging operating under non-boosted conditions at 512-514, as elaborated below.

If boosted conditions are confirmed, at 508, the routine includes flowing a portion of intake air compressed by a compressor through a first aspirator coupled across the compressor bypass, upstream of the engine intake manifold. In particular, a compressor bypass flow may be directed through the first aspirator and harnessed to generate vacuum. The first aspirator may be positioned in a conduit coupled across a compress bypass. Drawing vacuum at the first aspirator using compressor bypass flow may include opening a first valve to divert a portion of compressed intake air from downstream of the compressor, through the conduit and through the first aspirator, to upstream of the compressor. An amount of vacuum drawn at the first aspirator may be varied by a controller by adjusting a compressor bypass valve opening. In particular, the amount of vacuum drawn at the first aspirator may be increased as the compressor bypass valve opening is increased to divert a larger portion of compressed intake air through the first aspirator.

At 510, the vacuum drawn at the first aspirator using compressor bypass flow may be applied on a fuel system canister and a crankcase so that fuel vapors are purged from both the canister and the crankcase into an inlet of the compressor, for subsequent purging in the intake manifold. As such, during the boosted conditions, the fuel vapors from the canister and the crankcase gases are routed to the intake manifold via the compressor inlet. Purging fuel vapors from the canister includes opening a purge valve coupled between the canister and the intake manifold to draw fuel vapors from the canister along a purge line into the compressor inlet using the vacuum drawn at the first aspirator. At the same time, a ventilation valve may open so that crankcase gases can be drawn into the compressor inlet, along a ventilation line, into the compressor inlet using the vacuum drawn at the first aspirator. As shown at FIGS. 1-3, the purge line and ventilation line may merge so that fuel vapors from both the canister and the crankcase are merged into a common vacuum line and drawn into the compressor inlet along a first, common direction during the boosted conditions. This enables common handling of both vapors. Fuel vapors ingested at the compressor inlet may then be delivered to the intake manifold for subsequent combustion. Both vapors may be ingested substantially at atmospheric pressure. An opening of the purge valve may be based on a combustion air-to-fuel ratio desired at the engine and a position of the crankcase ventilation valve coupled between the crankcase and the intake manifold. Returning to 506, if boosted engine conditions are not confirmed, then at 512, the routine includes applying an intake manifold vacuum on the canister and the crankcase to draw in fuel vapors for purging. As such, during the non-boosted conditions, the fuel vapors from the canister and the crankcase are routed to the intake manifold directly. Purging fuel vapors from the canister includes opening the purge valve coupled between the canister and the intake manifold to draw fuel vapors from the canister along the purge line into the intake manifold using intake manifold vacuum generated by the spinning engine. At the same time, a ventilation valve may open so that crankcase gases can be drawn into the intake manifold, along the ventilation line, into the intake manifold. As shown at FIGS. 1-3, the purge line and ventilation line may merge so that fuel vapors from both the canister and the crankcase are merged into a common vacuum line and drawn into the intake manifold along the first, common direction during the non-boosted conditions. This enables common handling of both vapors. An opening of the purge valve may be based on a combustion air-to-fuel ratio desired at the engine and a position of the crankcase ventilation valve coupled between the crankcase and the intake manifold. For example, the purge valve opening may be based on whether the ventilation valve is in a high flow or low flow position.

Optionally, at 514, an intake manifold vacuum may be enhanced. As elaborated above, during the boosted conditions, the first aspirator in the compressor bypass provides the vacuum required for both fuel vapor purge and crankcase ventilation. Then, during non-boosted conditions, manifold vacuum is used to provide the vacuum required for both the fuel vapor purge and crankcase ventilation. However, during conditions when MAP is substantially at barometric pressure (BP), there may be insufficient manifold vacuum as well as not enough vacuum at the first aspirator. This leads to a vacuum valley. The lower vacuum availability during these conditions can reduce purging efficiency. As such, if the canister is not sufficiently purged and the crankcase is not properly ventilated, exhaust emissions may be degraded.

The intake manifold vacuum may be selectively enhanced by drawing vacuum at a second aspirator using intake throttle bypass flow. The second aspirator may be positioned in a conduit (or throttle bypass) coupled across an intake throttle. Drawing vacuum at the second aspirator using throttle bypass flow may include opening a second valve to divert a portion of intake air from upstream of the throttle, through the conduit and the second aspirator, to downstream of the throttle. An amount of vacuum drawn at the second aspirator may be varied by a controller by adjusting a throttle bypass valve opening, the amount of vacuum drawn at the second aspirator increased as the throttle bypass valve opening is increased.

Additionally, or alternatively, the intake manifold vacuum may be enhanced by flowing fuel vapors from the crankcase to the intake manifold via a third aspirator. The vacuum drawn at the third aspirator may then be applied on the canister to purge fuel vapors from the canister to the intake manifold. In this way, crankcase flow can be harnessed for enhancing intake manifold vacuum.

In one example, when operating an engine boosted, a controller may draw fuel vapors in a first direction from each of a fuel system canister and a crankcase into an engine intake manifold using vacuum drawn at a first aspirator coupled to a compressor. In particular, a portion of compressed air may be diverted from downstream of a compressor to upstream of the compressor via a first conduit (or compressor bypass) coupled across the compressor. The diverted portion of compressed air may be flowed through the first aspirator coupled in the first conduit, and vacuum may be drawn from the first aspirator. This vacuum generated at the first aspirator using the compressor bypass flow is then used as a purge vacuum during boosted conditions. Fuel vapors may be routed to the intake manifold via the compressor inlet. Herein, a flow rate of compressed air flow diverted through the first aspirator is independent of a position of the intake throttle. The portion of compressed air diverted through the first aspirator in the first conduit may be varied by adjusting a first valve coupled in the first conduit, upstream of the first aspirator. In this way, the purge vacuum generated can be varied.

In comparison, when operating the engine non-boosted, the controller may draw fuel vapors from each of the canister and the crankcase in the first direction into the intake manifold using intake manifold vacuum. Fuel vapors may be routed to the intake manifold directly. Further, the intake manifold vacuum may be selectively enhanced using vacuum drawn at a second aspirator coupled to an intake throttle. In particular, a portion of intake air may be diverted from upstream of an intake throttle to downstream of the throttle via a second conduit (or throttle bypass) coupled across the throttle. The diverted portion of intake air may be flowed through the second aspirator coupled in the second conduit, and vacuum may be drawn from the second aspirator. The portion of intake air diverted through the second aspirator in the second conduit may be varied by adjusting a second valve coupled in the second conduit, upstream of the second aspirator. Herein, a flow rate of intake air diverted through the second aspirator may be based on the position of the intake throttle.

Additionally, or optionally, the intake manifold vacuum may be selectively enhanced using vacuum drawn at a third aspirator coupled to the crankcase. In particular, crankcase gases and fuel vapors may be drawn into the intake manifold using the intake manifold vacuum along a ventilation line and via the third aspirator. The crankcase gases may be routed to the intake manifold through the third aspirator, and vacuum may be drawn from the third aspirator. Fuel vapors may then be drawn in the first direction from the canister and the crankcase into the intake manifold using the enhanced intake manifold vacuum. Herein, selectively enhancing the intake manifold vacuum includes enhancing the intake manifold vacuum when intake manifold pressure is a threshold distance from barometric pressure.

In this way, canister fuel vapor purge and crankcase ventilation can be merged and commonly handled. By using various aspirators, one or more of compressor bypass flow, throttle bypass flow, and crankcase flow can be harnessed to provide enhanced vacuum for the purging. By using throttle bypass flow or crankcase flow to generate vacuum at an aspirator during non-boosted conditions, intake manifold vacuum can be enhanced, reducing a vacuum valley when MAP is at BP. By using a compressor bypass flow to generate vacuum at a different aspirator during boosted conditions, canister and crankcase fuel vapors can be routed into the intake manifold in the same direction as during non-boosted conditions. By using a configuration that enables unidirectional flow of the fuel vapors during all purging operations, system complexity is reduced and component reduction benefits are achieved. By reducing a vacuum valley, sufficient purging of a canister and ventilation of a crankcase is enabled. Overall, emissions performance is improved without reducing fuel economy.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
    during boosted conditions, drawing vacuum at a first aspirator using compressor bypass flow;
    during non-boosted conditions, enhancing intake manifold vacuum by drawing vacuum at a second aspirator using intake throttle bypass flow; and
    during both conditions, applying the drawn vacuum to purge fuel vapors from each of a canister and a crankcase to an intake manifold.

2. The method of claim 1, wherein during the boosted conditions, the fuel vapors from each of the canister and the crankcase are routed to the intake manifold via a compressor inlet and wherein during the non-boosted conditions, the fuel vapors from each of the canister and the crankcase are routed to the intake manifold directly.

3. The method of claim 2, wherein during both the boosted and non-boosted conditions, fuel vapors flow from the crankcase to the intake manifold in a first direction through an oil separator.

4. The method of claim 1, wherein the first aspirator is positioned in a conduit coupled across a compressor bypass, and wherein drawing vacuum at the first aspirator using compressor bypass flow includes opening a first valve to divert a portion of compressed intake air from downstream of a compressor, through the conduit, to upstream of the compressor.

5. The method of claim 4, wherein an amount of vacuum drawn at the first aspirator is varied by adjusting a compressor bypass valve opening, the amount of vacuum drawn at the first aspirator increased as the compressor bypass valve opening is increased.

6. The method of claim 5, wherein the second aspirator is positioned in a conduit coupled across an intake throttle, and wherein drawing vacuum at the second aspirator using throttle bypass flow includes opening a second valve to divert a portion of intake air from upstream of the throttle, through the conduit, to downstream of the throttle.

7. The method of claim 6, wherein an amount of vacuum drawn at the second aspirator is varied by adjusting a throttle bypass valve opening, the amount of vacuum drawn at the second aspirator increased as the throttle bypass valve opening is increased.

8. The method of claim 7, wherein purging fuel vapors from the canister includes opening a purge valve coupled between the canister and the intake manifold, the opening of the purge valve based on a combustion air-to-fuel ratio and a position of a crankcase ventilation valve coupled to the crankcase and the intake manifold.

9. The method of claim 2, further comprising, during non-boosted conditions, enhancing intake manifold vacuum by flowing fuel vapors from the crankcase to the intake manifold via a third aspirator, and
applying the vacuum drawn at the third aspirator to purge fuel vapors from the canister to the intake manifold.

10. A method for an engine, comprising:
when operating the engine boosted, drawing fuel vapors in a first direction from each of a fuel system canister and a crankcase into an engine intake manifold using vacuum drawn at a first aspirator coupled to a compressor; and
when operating the engine non-boosted, drawing fuel vapors from each of the canister and the crankcase in the first direction into the intake manifold using intake manifold vacuum, selectively enhancing the intake manifold vacuum using vacuum drawn at a second aspirator coupled to an intake throttle, and drawing fuel vapors in the first direction from the canister and the crankcase into the intake manifold using the enhanced intake manifold vacuum.

11. The method of claim 10, wherein selectively enhancing the intake manifold vacuum includes enhancing the intake manifold vacuum when intake manifold pressure is a threshold distance from barometric pressure.

12. The method of claim 10, wherein using vacuum drawn at the first aspirator coupled to the compressor includes diverting a portion of compressed air from downstream of the compressor to upstream of the compressor via a first conduit coupled across the compressor, flowing the diverted portion of compressed air through the first aspirator coupled in the first conduit, and drawing vacuum from the first aspirator.

13. The method of claim 12, wherein using vacuum drawn at the second aspirator coupled to the intake throttle includes diverting a portion of intake air from upstream of the throttle to downstream of the throttle via a second conduit coupled across the throttle, flowing the diverted portion of intake air through the second aspirator coupled in the second conduit, and drawing vacuum from the second aspirator.

14. The method of claim 13, wherein the portion of compressed air diverted through the first aspirator in the first conduit is varied by adjusting a first valve coupled in the first conduit, upstream of the first aspirator, and wherein the portion of intake air diverted through the second aspirator in the second conduit is varied by adjusting a second valve coupled in the second conduit, upstream of the second aspirator.

15. The method of claim 12, wherein a flow rate of compressed air flow diverted through the first aspirator is independent of a position of the intake throttle, and wherein a flow rate of intake air diverted through the second aspirator is based on the position of the intake throttle.

16. The method of claim 10, further comprising, when operating the engine non-boosted, enhancing manifold vacuum by drawing fuel vapors in the first direction from the crankcase into the engine intake manifold through a third aspirator, and drawing fuel vapors in the first direction from the canister into the intake manifold using the enhanced manifold vacuum.

17. The method of claim 10, wherein drawing fuel vapors into the intake manifold when operating the engine boosted includes drawing fuel vapors into the intake manifold via a compressor inlet, and wherein drawing fuel vapors into the intake manifold when operating the engine non-boosted includes drawing fuel vapors into the intake manifold directly.

18. An engine system, comprising:
an engine including an intake manifold;
a compressor for providing a boosted aircharge;
a compressor bypass including a compressor bypass valve for diverting a first portion of intake air around the compressor;
a first aspirator coupled to the compressor bypass;
a throttle coupled in the intake manifold;
a throttle bypass including a throttle bypass valve for diverting a second portion of intake air around the throttle;
a second aspirator coupled to the throttle bypass;
a crankcase coupled to the intake manifold;
a canister for storing fuel vapors generated in a fuel tank; and
a controller with computer readable instructions for,
operating the compressor to provide a boosted intake aircharge;
while operating boosted, flowing the first portion of diverted intake air through the first aspirator, from an aspirator inlet to an aspirator outlet, and generating vacuum at a vacuum inlet of the first aspirator;
applying the generated vacuum to draw fuel vapors in a first direction from the canister and the crankcase to upstream of the compressor; and
combusting the drawn fuel vapors in the engine.

19. The system of claim 18, where the controller includes further instructions for,
while operating non-boosted, flowing the second portion of diverted intake air through the second aspirator, from an aspirator inlet to an aspirator outlet, and generating vacuum at a vacuum inlet of the second aspirator;
applying the generated vacuum and an intake manifold vacuum to draw fuel vapors in the first direction from the canister and the crankcase to the intake manifold, downstream of the throttle; and
combusting the drawn fuel vapors in the engine.

* * * * *